United States Patent [19]

Lapeyre

[11] 4,140,025
[45] Feb. 20, 1979

[54] LINK CHAIN HAVING NON-FRICTIONAL COUPLINGS

[75] Inventor: James M. Lapeyre, New Orleans, La.

[73] Assignee: The Laitram Corporation, New Orleans, La.

[21] Appl. No.: 706,535

[22] Filed: Jul. 19, 1976

[51] Int. Cl.² .............. F16G 13/04; F16G 13/07
[52] U.S. Cl. ............... 74/255 R; 74/251 R; 74/251 C; 74/254
[58] Field of Search .......... 74/251 R, 251 C, 251 S, 74/253 R, 253 S, 254, 245 P, 245 C, 255 R, 255 S, 256, 258; 59/DIG. 1

[56] References Cited

U.S. PATENT DOCUMENTS

| 761,034 | 5/1904 | Dodge | 74/255 R |
|---|---|---|---|
| 901,789 | 10/1908 | Dodge | 74/255 R |
| 1,569,234 | 1/1926 | Muller | 74/253 R |
| 1,907,636 | 5/1933 | Woodman | 74/251 R |
| 1,907,637 | 5/1933 | Woodman | 74/251 R |
| 1,907,637 | 5/1933 | Woodman | 74/251 R |
| 2,036,216 | 4/1936 | Johnson | 74/251 S |
| 2,047,833 | 7/1936 | Pierce | 74/255 S |
| 2,093,156 | 9/1937 | Muller | 74/251 S |
| 2,324,640 | 7/1943 | Perry | 74/253 R |
| 2,987,332 | 6/1961 | Bonmartini | 74/254 |
| 3,092,423 | 6/1963 | Speidel, Jr. et al. | 74/254 |
| 3,390,642 | 7/1968 | Torrance | 74/243 |
| 3,726,569 | 4/1973 | Maglio et al. | 74/254 |
| 3,880,014 | 4/1975 | Bendall | 74/253 R |

FOREIGN PATENT DOCUMENTS 8736 of 1912 United Kingdom ............... 74/253 R

Primary Examiner—Samuel Scott
Assistant Examiner—William R. Henderson
Attorney, Agent, or Firm—Weingarten, Maxham & Schurgin

[57] ABSTRACT

A link chain useful for transmission and conveyor purposes in which the links are interconnected by flexible strip members which accommodate relative angular movement of each link with respect to the strip members and links without need for pivot pins and without frictional movement between adjacent links.

10 Claims, 5 Drawing Figures

LINK CHAIN HAVING NON-FRICTIONAL COUPLINGS

FIELD OF THE INVENTION

This invention relates to link chains and more particularly to a transmission or conveyor chain having no pivot pins interconnecting adjacent links.

BACKGROUND OF THE INVENTION

In the well known link chain, such as a bicycle chain, adjacent links are interconnected by means of pivot pins which permit each link to be rotatable about the axis of the pin such that the chain is movable on a sprocket around a curved path. While such chains have been employed for many years and are of extremely well known design and construction, the chains are subject to frictional wear by reason of relative movement between the links and pivot pins. The wear of conventional link chains results in loosening of the couplings of the links and unwanted play which can detract from performance and efficiency. In addition, relative rotational movement of conventional links about the associated pivot pins can be encumbered by the presence of dirt and debris at the pivot points.

SUMMARY OF THE INVENTION

In brief, the present invention provides a link chain in which the links are joined one to the other by flexible, tensile strip members which rigidly interconnect the links along the axis of the chain, and accommodate relative angular movement of each link with respect to adjacent links without need for pivot pins and without frictional movement between adjacent links. A flexible, thin strip member is secured along an edge thereof to an end of a link, while the opposite edge of such strip is secured to the confronting end of an adjacent link to provide a flexibly and non-frictionally coupled link pair, the links of each adjacent pair being relatively movable about a transverse axis by flexure of the strip member. The strip members have tensile strength sufficient to provide a chain of intended strength while having sufficient flexibility to accommodate angular movement of the links. The novel chain can be employed as a transmission chain or as a conveyor chain. For conveyor applications, a plurality of links is usually arrayed side by side to provide an intended width, the links being secured along the width of the conveyor by the flexible strip members. For transmission purposes, the chain can be of single link or multiple link width.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
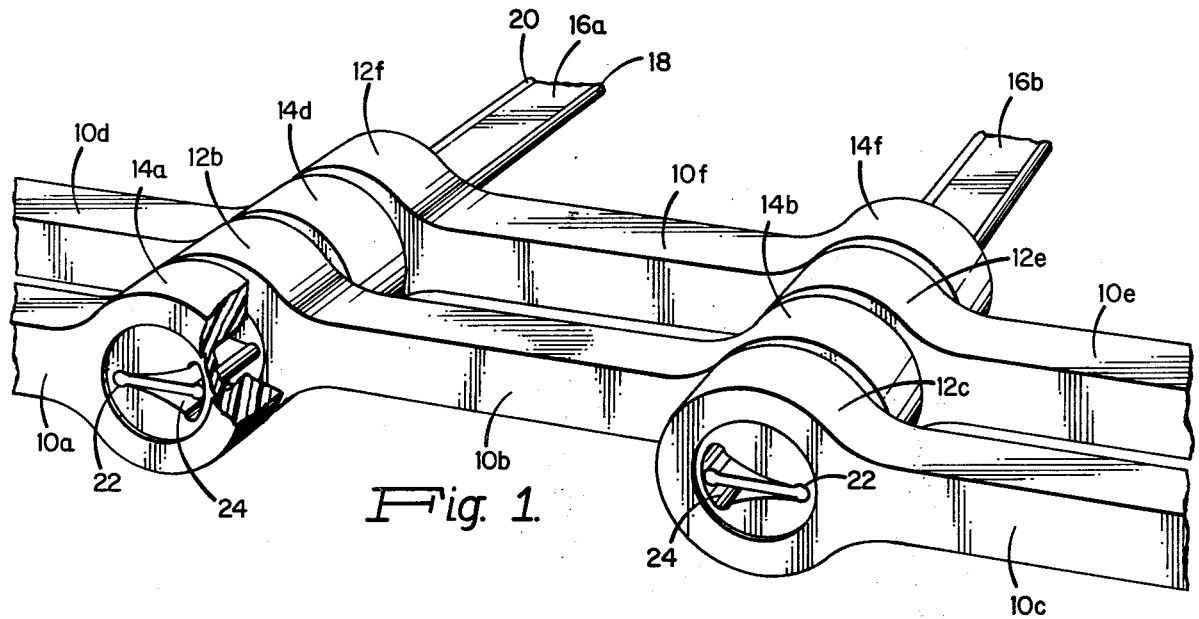
FIG. 1 is a cutaway pictorial view of a link chain embodying the invention.
Figure 2:
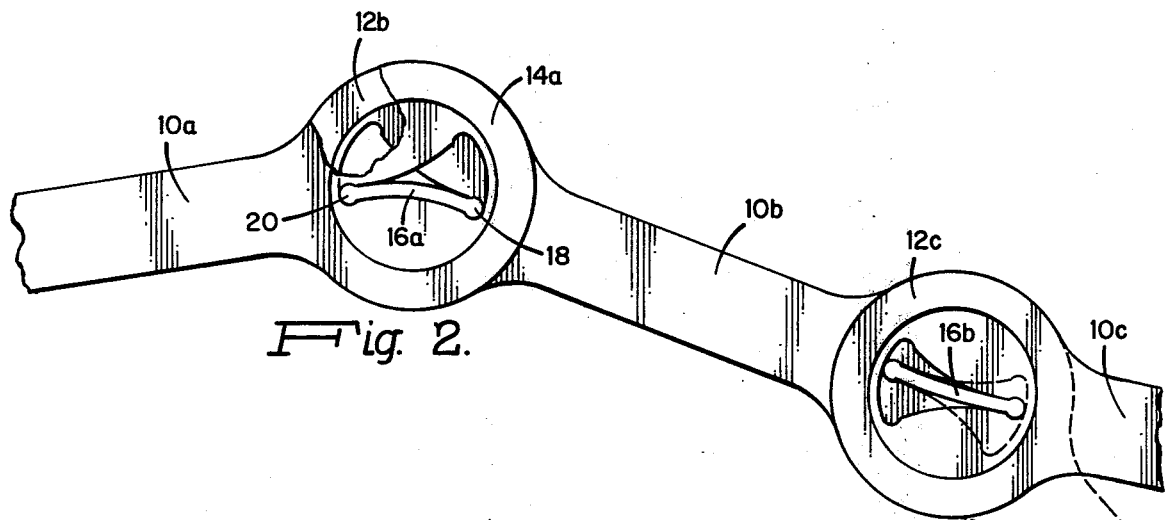
FIG. 2 is a cutaway elevation view of the embodiment of FIG. 1.
Figure 3:
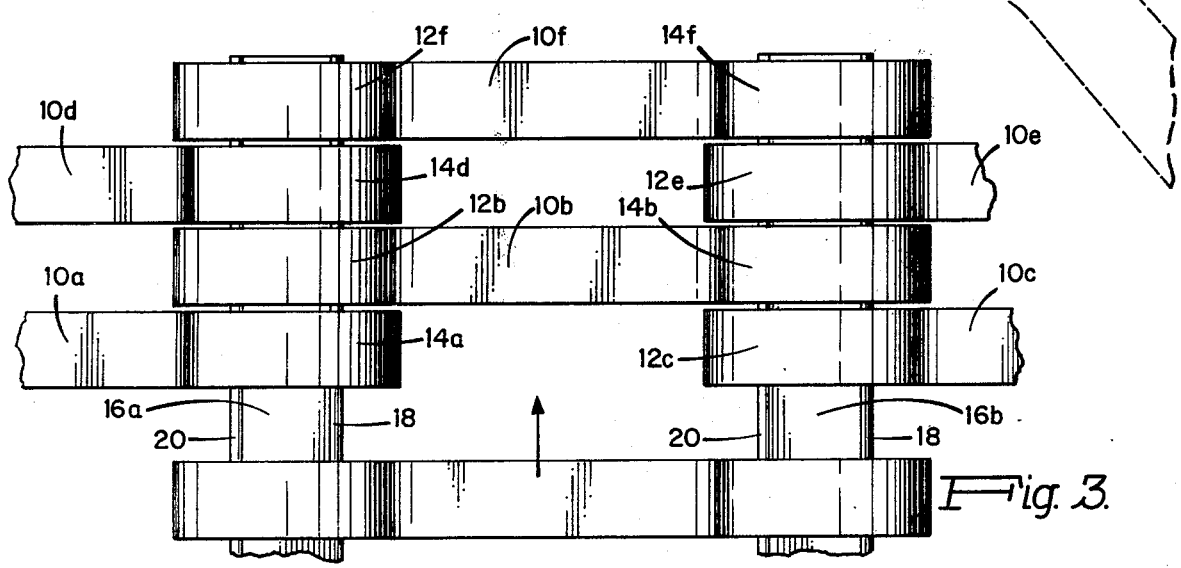
FIG. 3 is a cutaway plan view of the embodiment of FIG. 1.

A link chain constructed and operative according to the invention is shown in FIGS. 1 through 3, and includes a plurality of elongated links 10, each connected end to end with like links to provide a chain of predetermined length, and also laterally coupled to other like links to provide a chain of intended width. Each link 10 includes first and second enlarged end portions 12 and 14, within which is secured for flexural movement a relatively thin flexible strip member 16. In the illustrated embodiment, strip member 16 includes enlarged edges 18 and 20 which are cooperative with corresponding slots 22 in the end portions 12 and 14 of links 10 for anchoring of the strip member to the associated links. Each link end portion includes an anchoring slot 22 or other means for anchoring an edge of the strip member to the associated link end. An outwardly flared opening 24 is provided in each link end portion to define a space within which the strip member 16 can bend or flex during movement of a link with respect to the adjacent link as the chain travels a curved path.

In the illustrated embodiment a plurality of links 10 are arranged and interconnected in side by side relationship to provide a chain of intended width, and also interconnected end to end to provide a chain of intended length. A link end 14a of link 10a is disposed adjacent to link end 12b of an adjacent link 10b, the end 14b of link 10b being adjacent end 12c of link 10c. Link end 12b is also disposed adjacent to end 14d of laterally adjacent link 10d. Link end 14b is also laterally adjacent to end 12e of link 10e. In like manner an array of links are laterally and longitudinally coupled to provide a chain of desired size. The adjacent link ends are interconnected by a strip member 16. In the embodiment shown in FIGS. 1 through 3 a strip member 16a interconnects adjacent link ends 14a, 12b, 14d and 12f. A strip member 16b interconnects link ends 12c, 14b, 12e and 14f. The strip members 16 each include side edges 18 and 20 and which are of enlarged cross-section and which serve to anchor the strip member to the associated link ends. The strip member 16a is secured at edge 20 within the corresponding anchoring slot 22 of link end 14a, while the opposite edge 18 is secured within the corresponding anchoring slot of adjacent link end 12b. Similarly, the edge 20 of strip member 16a is retained within the anchoring slot of link end 14d while the anchoring slot of end 12f secures the edge 18 of strip member 16a. It is seen that the strip member is secured to adjacent link ends at opposite edges such that relative angular movement of the adjacent links is provided by flexure of the strips along the width. The strip members are slidably inserted, as shown in FIG. 3, into the associated anchoring grooves 22 of the link ends to couple an intended plurality of links for a given chain configuration.

In typical operation, the transmission or conveyor chain is installed for movement through a closed path and is driven by a sprocket while disposed at one or more positions in the travel path. During movement around a curve, the longitudinally adjacent links 10 are angularly movable with respect to each other by means of the flexural action of strip member 16. As seen in FIG. 2, for example, angular movement of link 10a with respect to link 10b is permitted by the flexing of strip member 16a which is shown in engagement with the lower surface of opening 24. The configuration and dimensions of the flex space provided by opening 24 is determined in accordance with the degree of angular movement required between adjacent links of a particular chain. It will be appreciated that the novel chain suffers no sliding or rotational frictional contact between adjacent links since no pivot pins are employed, as in a conventional link chain. Relative movement between adjacent links is provided solely by flexure of the strip members interconnecting the links.

In the embodiments described above, the end portions 12 and 14 of the links 10 can be cooperative with a sprocket wheel for propulsion of the chain. The end portions can be suitably configured in any well known sprocket tooth shape for intended mating with the sprocket wheel. The invention can be alternatively implemented as shown in FIGS. 4 and 5 in which a sprocket tooth structure is provided at the central portion of links 10 between the enlarged end portions of the links.

Figure 4:
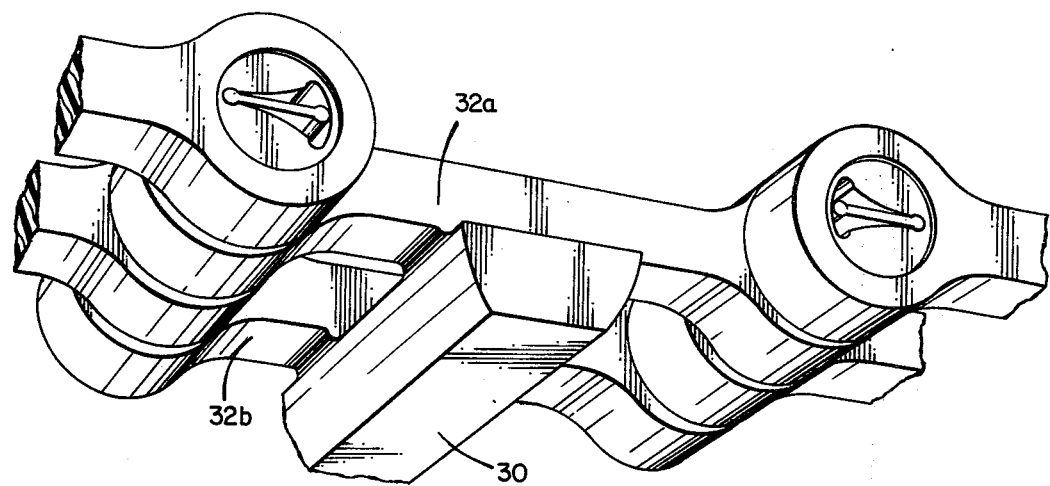
FIG. 4 is a cutaway pictorial view of an alternative embodiment of the invention employing a sprocket tooth extending across the width of the link chain.

Referring to FIG. 4, a sprocket tooth 30 is joined to links 32a and 32b at a position centrally disposed between the end portions thereof and extending transversely to the longitudinal axis of the links. The tooth 30 can be integrally formed with the associated links 32a and 32b or can be a separate element bonded or otherwise affixed to the links. In this embodiment of FIG. 4 the links are maintained in a transversely extending array by the tooth 30 extending along the width thereof, and thus chain sections are provided which can be interconnected with cooperative sections to form a chain of intended length.

Figure 5:
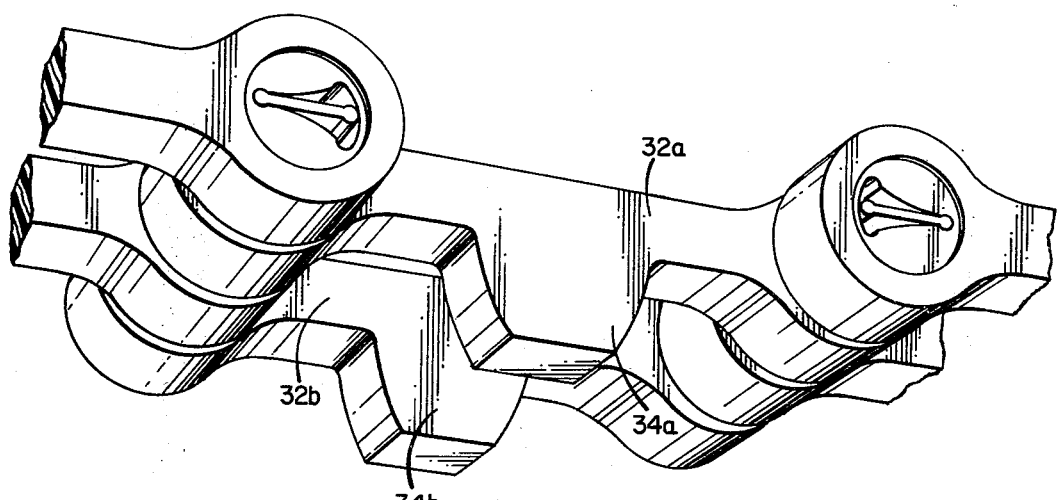
FIG. 5 is a cutaway pictorial view of a further embodiment of the invention employing distinct sprocket teeth.

In a further embodiment, illustrated in FIG. 5, each link includes a respective sprocket tooth. A sprocket tooth 34a is provided centrally of link 32a while a tooth 34b is provided with link 32b. Each of the links 32 and associated sprocket teeth 34 is a physically distinct element and thus a plurality of links can be arrayed to provide a chain of intended width and connected with like arrays of links to provide an intended length.

It is contemplated that the links and strip members can be formed of various materials depending upon needed structural requirements and it is also contemplated that the strip member can be secured to the link ends by various means. Accordingly, it is not intended to limit the invention by what has been particularly shown and described except as indicated in the appended claims.

What is claimed is:

1. A link chain comprising:
   a plurality of links each having first and second link ends;
   one end of each link being in aligned relative movable disposition with an adjacent end of a laterally adjacent link of said chain;
   each link being connected to an adjacent link by a flexible tensile strip member rigid along the axis of the chain, and deformable only under bending stress caused by relative angular movement of adjacent links, and affixed to said one link end and to said adjacent link end and coupling said link ends for relative angular movement of adjacent links by non-rotational flexural movement of said strip member;
   each of said link ends being enlarged with respect to the link body interconnecting the ends and each of said link ends including a flared opening having a narrow end in which said strip member is affixed and a flared end within which said strip member can flex during relative angular movement of adjacent links.

2. The link chain of claim 1 wherein said strip member is affixed to the narrow end of said one link end along a first edge of said strip member and affixed to the narrow end of said adjacent link end along an opposite edge of said strip member.

3. The link chain of claim 1 wherein each of said plurality of links includes a sprocket tooth disposed between said link ends and outwardly extending from the body of said link and adapted for cooperation with a sprocket for movement of said chain through an intended path.

4. The link chain of claim 1 wherein the narrow end of the flared opening of each link end is a slotted end in which said strip member is affixed along an edge thereof.

5. A link chain comprising:
   a plurality of links each having first and second link ends;
   one end of each link being in aligned relative movable disposition with an adjacent end of a laterally adjacent link of said chain;
   each link being connected to an adjacent link by a flexible tensile strip member rigid along the axis of the chain, and deformable only under bending stress caused by relative angular movement of adjacent links, and affixed to said one link end and to said adjacent link end and coupling said link ends for relative angular movement of adjacent links by non-rotational flexural movement of said strip member;
   each of said link ends including a flared opening having a narrow end in which said strip member is affixed and a flared end within which said strip member can flex during relative angular movement of adjacent links.

6. The link chain of claim 5 wherein each set of adjacent links includes a sprocket tooth affixed to and interconnecting the links of said set between the link ends and outwardly extending from said links and adapted for cooperation with a sprocket for driving of said chain through an intended path.

7. The link chain of claim 5 wherein the links disposed along each transverse axis comprise a chain section;
   for each section, a sprocket tooth affixed to and interconnecting the links of said section, said tooth being disposed between said link ends and extending along a transverse axis.

8. The link chain of claim 5 wherein said strip member is affixed to the narrow end of said one link end along a first edge of said strip member and affixed to the narrow end of said adjacent link end along an opposite edge of said strip member.

9. The link chain of claim 5 wherein the narrow end of the flared opening of each link end is a slotted end in which said strip member is affixed along an edge thereof.

10. A link chain comprising:
    a plurality of links each having first and second link ends;
    one end of each link being disposed along an axis transverse to the longitudinal axis of the link in aligned relative movable relationship with an adjacent end of a laterally adjacent link;

each of said link ends including a flared opening through which said axis passes and having a narrow end and a flared end;

an elongated flexible thin tensile strip member disposed along the transverse axis of each set of adjacent links and affixed to the narrow end of the flared opening of said one link end and to the narrow end of the flared opening of said adjacent link end for coupling said link ends for relative angular movement of adjacent links by non-rotational flexural movement of said strip member;

said strip member being rigid along the axis of the chain, and deformable only under bending stress caused by relative angular movement of adjacent links.

* * * * *